United States Patent [19]
Ferrentino

[11] 3,739,803
[45] June 19, 1973

[54] OIL COMPENSATION SYSTEM FOR ELECTRIC POWER CABLES IMPREGNATED WITH INSULATING OIL

[75] Inventor: Antonio Ferrentino, Monza, Italy
[73] Assignee: Industrie Pirelli Societa Per Azioni, Milan, Italy
[22] Filed: Apr. 7, 1972
[21] Appl. No.: 242,127

[30] Foreign Application Priority Data
June 11, 1971 Italy ............................. 25700 A/71

[52] U.S. Cl. .............. 137/255, 29/622, 174/52 PE, 200/168 G
[51] Int. Cl. ............................................ F17d 1/00
[58] Field of Search .................. 137/255, 265, 208; 174/52 PE; 29/622; 200/168 G

[56] References Cited
UNITED STATES PATENTS
| | | | |
|---|---|---|---|
| 3,158,193 | 11/1964 | Anderson............................ | 137/255 |
| 3,584,106 | 6/1971 | Miller.............................. | 174/52 PE |
| 3,636,622 | 1/1970 | Schmitt............................. | 29/622 |

*Primary Examiner*—Henry T. Klinksiek
*Assistant Examiner*—Robert J. Miller
*Attorney*—Lorimer P. Brooks, Alfred L. Haffner, Jr., Harold Haidt et al.

[57] ABSTRACT

A system for compensating for normal and abnormal changes in oil volume in an oil-impregnated electric power cable comprising one or more two-part pressure tanks with one part containing the oil and connected to the cable oil duct to supply such oil thereto and with the other part applying pressure to the oil in the one part over the normal operating oil pressure range and one or more similar two-part pressure tanks similarly connected to the cable oil duct through a flow regulating valve but having the oil under a pressure at or below the lowest normal operating oil pressure so that oil is supplied to the cable duct thereby only when the cable oil pressure decreases to, or below, the lowest normal operating pressure. unit is mounted in an opening in the bottom of a cup-shaped plastic jacket, and has two terminals which project into the jacket and which have lead wires connected thereto. The wires extend out through notched openings in the side of the jacket, and are retained in those openings by a ring member which seats on the open end of the jacket and which has a diametral web at opposite sides of which the lead wires are disposed. The can has a flared open end; and the can and ring member are secured in place by epoxy flowed into the open end of the can and around its flared end and into the jacket to a point beneath the notched openings.

9 Claims, 3 Drawing Figures

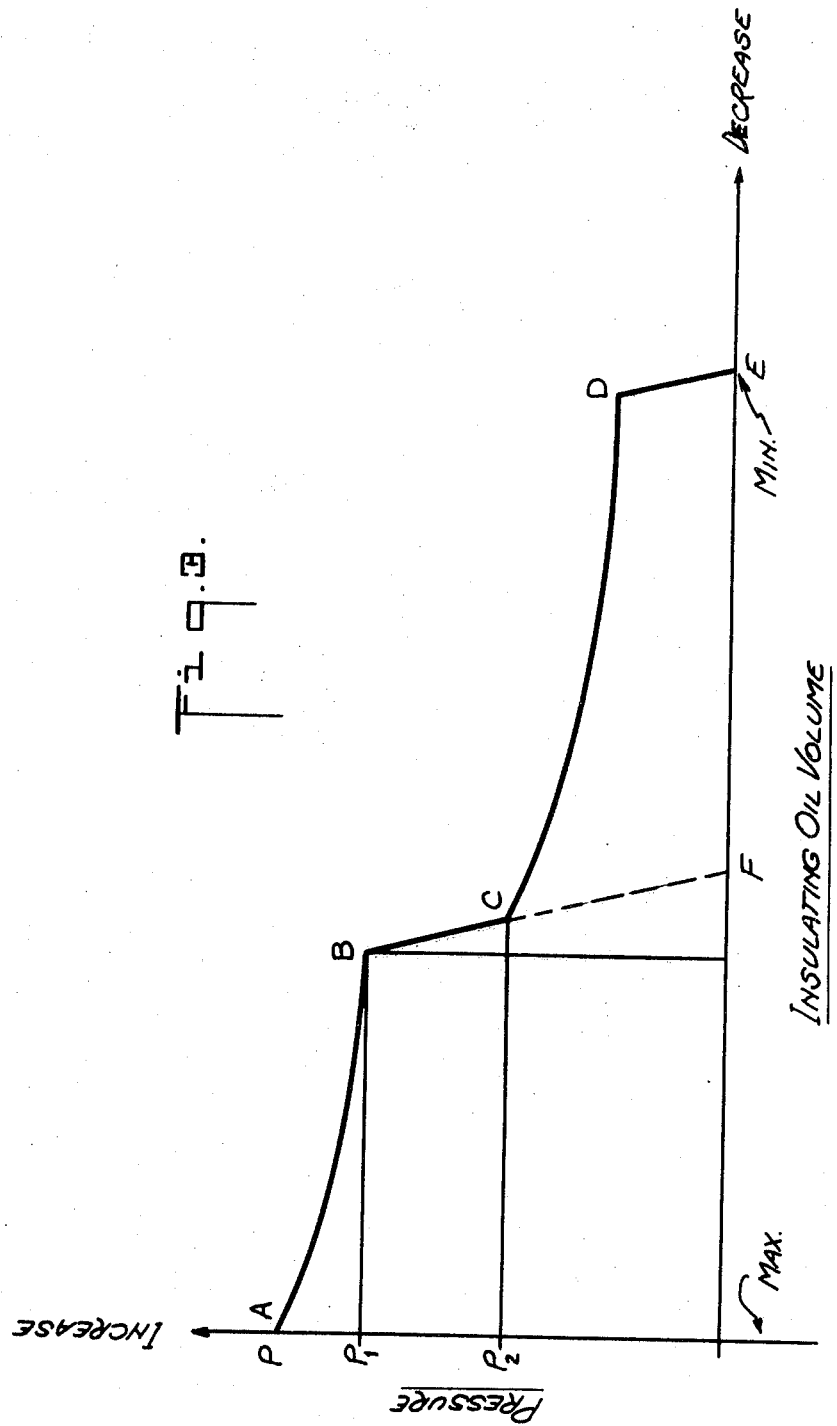

OIL COMPENSATION SYSTEM FOR ELECTRIC POWER CABLES IMPREGNATED WITH INSULATING OIL

The present invention concerns an improved system which can be used particularly, but not exclusively, for compensating for the loss of the impregnating fluid in power cables filled with oil at high pressure (above 10 atmospheres) especially long-length cables, such as submarine cables, in the event of leaks, and which provides automatic action, without the use of moving mechanical elements, or apparatus for maintaining the oil at a pre-established pressure and for a predetermined time.

The expression "compensation system" means the group of means which acts automatically in order to supply insulating oil to an oil-filled cable in the case of a leak, or to absorb if the oil volume should vary as a consequence of the temperature variations.

Up to this time, the oil pressure in a leaking cable, in particular, in cables operating under high pressures, was maintained by means of pumps which, although they can provide an automatic action in case of leaks, have serious disadvantages.

Among these, the following are the most relevant: the pumps are often unable to ensure a good tightness, the insulating fluid can be contaminated, the moving mechanical elements require a continuous watch, and operating mechanisms are necessary, such as pressure switches, relays, etc., which make the system complex and delicate.

The present invention aims at providing a compensation system, comprising a device for automatically maintaining the oil pressure in the event of leaks, which, by eliminating the presence of rotating elements and reducing to a minimum the control means, obviates the above-mentioned disadvantages.

In particular, the system according to the invention provides the maximum protection against contamination, is structurally simple and, being based on essentially fixed parts, requires a minimum of watching and maintenance as compared to the conventional systems, thereby providing, in addition to such technical advantages, remarkable economic advantages.

More particularly, the object of the present invention is an improved compensation system for power cables impregnated with insulating oil, which comprises a first group of one or more pressure tanks, with a related expansion chamber, able to operate at high pressures and arranged in parallel to one another with respect to the cable, and with their "thrust oil side" at operating pressure, and at least a second group of one or more pressure tanks, with a related expansion chamber, arranged in parallel to one another and to the first group on the same end of the cable, the pressure tanks of the second group being of the type able to operate at high pressure and having their "thrust oil side" rated at a pressure lower than the operating pressure of the cable. The pressure tanks are of a known type and have means for supplying and absorbing the cable fluid, preferably insulating oil, which is fully separated from the thrust oil.

In the compensating pressure tanks, the separating elastic diaphragm defines two sides, one constituted by the space occupied by the insulating oil, which will be called "insulating oil side", and the other constituted by the oil having the task of exerting a pressure on the insulating oil through the elastic diaphragm, which will be called "thrust oil side." The elastic diaphragm moves between two stop positions: one (upper stop position) corresponds to the maximum volume of insulating oil which can be contained in the pressure tanks, while the other (lower stop position) corresponds to the complete exhaustion of said insulating oil which can be contained in the pressure tanks.

The accompanying sheets of drawing illustrate by way of example embodiments of the invention, and in such drawings:

FIG. 3 is a graph illustrating the operation of the compensation system for the cable as a function of the pressure existing in the latter.

Figure 1:
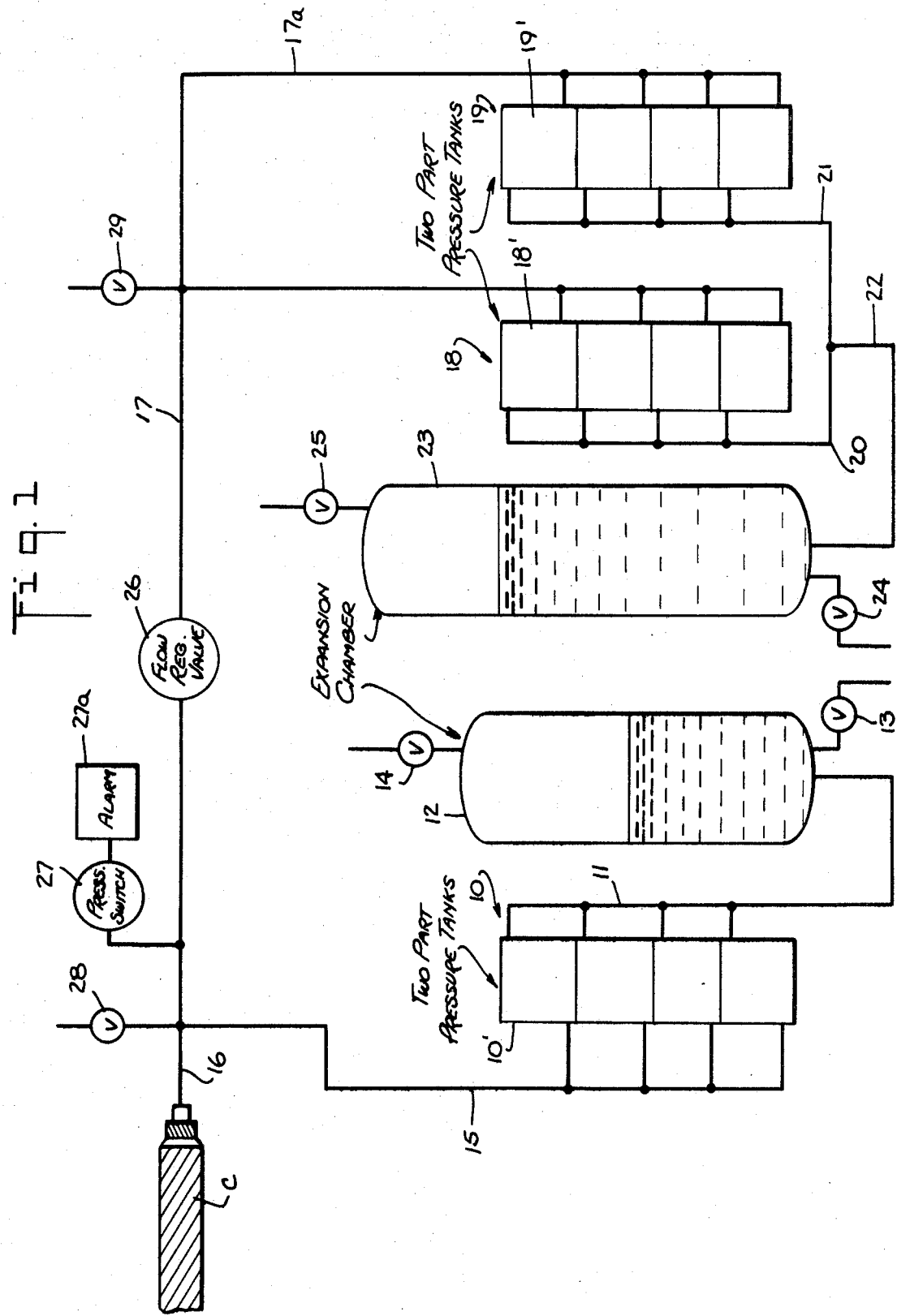
FIG. 1 represents diagrammatically a preferred embodiment of the compensation system according to the invention.

The preferred embodiment of the compensation system according to the invention and which is shown in FIG. 1, comprises at least a first group 10 of pressure tanks 10' of the type able to operate at high pressures. Pressures over 10 atmospheres are considered as high, but the system can also be used for lower pressures.

The tanks 10' are arranged in parallel to one another and are connected, at their thrust oil side, through a pipe 11, to a single expansion chamber 12 provided with a filling and discharge valve 13 and with an admission valve 14. Although not preferred, a single tank 10' instead of a group of tanks 10' could be used.

At the insulating oil side, the group 10 of parallel pressure tanks 10' is connected, through a pipe 15 provided with a valve 28, to the manifold 16, which extends to the oil duct of the cable C to be compensated and to one end of the latter. In other words, the tanks 10' are connected in parallel to one another and to the cable C.

The pipe 15 is also joined to a pipe 17 coming from the insulating oil side of a second group 18 of pressure tanks 18' arranged in parallel. If desired, the pipe 17 may also connect, via pipe 17a, to a third group 19 of pressure tanks 19'. The pipe 17 is provided with a flow-regulating valve 26 and with an alarm device which comprises a pressure switch 27 and an alarm 27a. Instead of a group of tanks 18' and 19', a single tank 18' and a single tank 19' may be used.

The pressure tanks 18' and 19', forming groups 18 and 19, are all equal and of the type which can operate at high pressures. The groups 18 and 19 of tanks are therefore arranged in parallel to the first group 10 on the same end of cable C.

The tanks 10' and the tanks 18' and 19' are preferably those described in my co-pending application Ser. No. 146,295 filed May 24, 1971, now U.S. Pat. No. 3,695,297 and entitled "Compensating Pressure Tank for Oil-Filled Cables." As described therein, each tank is divided into two chambers by an elastic diaphragm or bellows which is limited to predetermined travel by a pair of stops. One of the chambers is filled with oil of the cable and is connected to the cable oil duct and the other chamber contains fluid under pressure for actuating the diaphragm and is connected to an expansion chamber.

The groups 18 and 19 of pressure tanks in parallel comprise, at the thrust oil side, the pipes 20 and 21, respectively, which join with a pipe 22. The pipe 22 is connected to the corresponding expansion chamber 23, provided with a filling and discharge valve 24 and with an admission valve 25.

The pipes 15 and 17 are provided with valves 28 and 29, respectively, which serve for filling the system with insulating oil at the time of its fitting and installation. In fact, at the same time, insulating oil is supplied to the pressure tanks 10', 18' and 19', previously filled only with the thrust oil at the thrust oil side, through said valves 28 and 29, while the discharge valves 13 and 24 of chambers 12 and 23 are open.

During the filling with insulating oil, the thrust oil passes from groups 10, 18 and 19 of pressure tanks in parallel to the expansion chambers 12 and 23, respectively. In each of these chambers, the volume of the thrust oil must be at least equal to, or greater than, the oil volume corresponding to the total capacity of the group or groups of tanks connected thereto, and can be adjusted by means of the filling and discharge valves 13 and 24.

After having closed the supply valves 28 and 29, compressed air or gas is admitted through the admission valves 14 and 25, so as to establish in chamber 12 a pressure $p$ corresponding to the cable oil operating pressure, and in chamber 23 a predetermined pressure $p_2$, lower than the cable oil operating pressure, taking also into account its possible variations with temperature. For example, with a tolerance range of ± 10 percent $p$, $p_2$ should be no greater than $p$ minus 10 percent $p$.

As long as no leaks occur in the cable, the group 10 of pressure tanks 10' compensate for the variations in the volume of insulating oil in cable C which are due to the temperature variations in the cable and which are within the tolerance limits indicated for that type of cable.

In these conditions, the groups 18 and 19 of pressure tanks 18' and 19', respectively, cannot enter into compensating action, since pressure p on the insulating oil is higher than pressure $p_2$ in the expansion chamber of the thrust oil, and therefore, the separation diaphragms between the insulating oil side and the thrust oil side are all brought by the insulating oil to the stop position corresponding to the maximum volume of insulating oil consistent with such pressure tanks (upper stop position).

The operation of the system is better understood from the graph of FIG. 3, in which the abscissae represent the oil volumes of the system expressed, for example, in cubic meters, and the ordinates represent the pressures in the manifold 16 expressed, for example, in kilograms per square centimeter.

The origin of the abscissae is made coincident with the initial condition of maximum volume of insulating oil which can be contained in the system, namely, when the diaphragms in the pressure tanks have reached the upper stop position and a puressure $p$ exists in the manifold 16.

Assuming that, for a temperature variation (decrease) or for a leak, the oil flows from the pressure tanks 10' into the cable C, a pressure drop will be noticed, in this case, as a result of the flow of oil from the compensating system towards the cable. If the volume-pressure curve (assuming, for present purposes, isothermal conditions) corresponding to the variations in question is examined, a curve AB will be obtained, which has a hyperbolic shape.

The point B corresponds to the complete exhaustion of the insulating oil which can be supplied by the group 10 of pressure tanks 10', since the diaphragms have reached the other stop position (lower stop position). The points A and B correspond theoretically to the limits within which are contained the admissible variations of the volumes of insulating oil in the cable. Obviously, in the practice, such variations will be contained in a zone which has an adequate margin of safety with respect to the extreme points. Therefore, the point B is actually reached only in the event of leaks.

From the point B a further amount of oil flows out of the cable through the leak only as a result of the elasticity of the oil ducts or pipes (cable included). Therefore, the pressure would quickly drop to zero at the point F if the tanks 18' and 19' were not connected to the system. However, at the point C, corresponding to the operating pressure $p_2$ of the pressure tanks 18' and 19', these tanks enter into the compensating action and supply insulating oil to the cable C.

The curve of pressures, starting from the point C, follows the curve CD. Again, assuming isothermal conditions, the curve CD has a hyperbolic shape up to the point D, corresponding to the lower stop positions of the pressure tanks 18' and 19'. If the cable is not repaired before the pressure reaches the point D, pressure falls finally to zero along the line DE, in which oil leaks from the cable only because of the elasticity of the ducts.

The flow-regulating valve 26 ensures that during the operation of groups 18 and 19 of tanks the insulating oil is not rapidly dispersed out of cable C, i.e. it supplies said cable C at a regulated and constant delivery rate, so as to prevent both the quick exhaustion of the reserve oil and the penetration of air in ground cables, or of water in submarine cables, at the point of the leak. Moreover, the volume of groups 18 and 19 of tanks may be of a size which will maintain the emergency supply even for several days, so as to allow the personnel to work on the cable beginning at the time of the operation of the warning alarm 27a, which is operated by the pressure switch 27 when the pressure decreases below the limits for normal operations, e.g., the point B in FIG. 3.

If necessary, the groups of tanks 18 and 19 can be repeatedly filled through the valve 29 even during the emergency phase.

Figure 2:
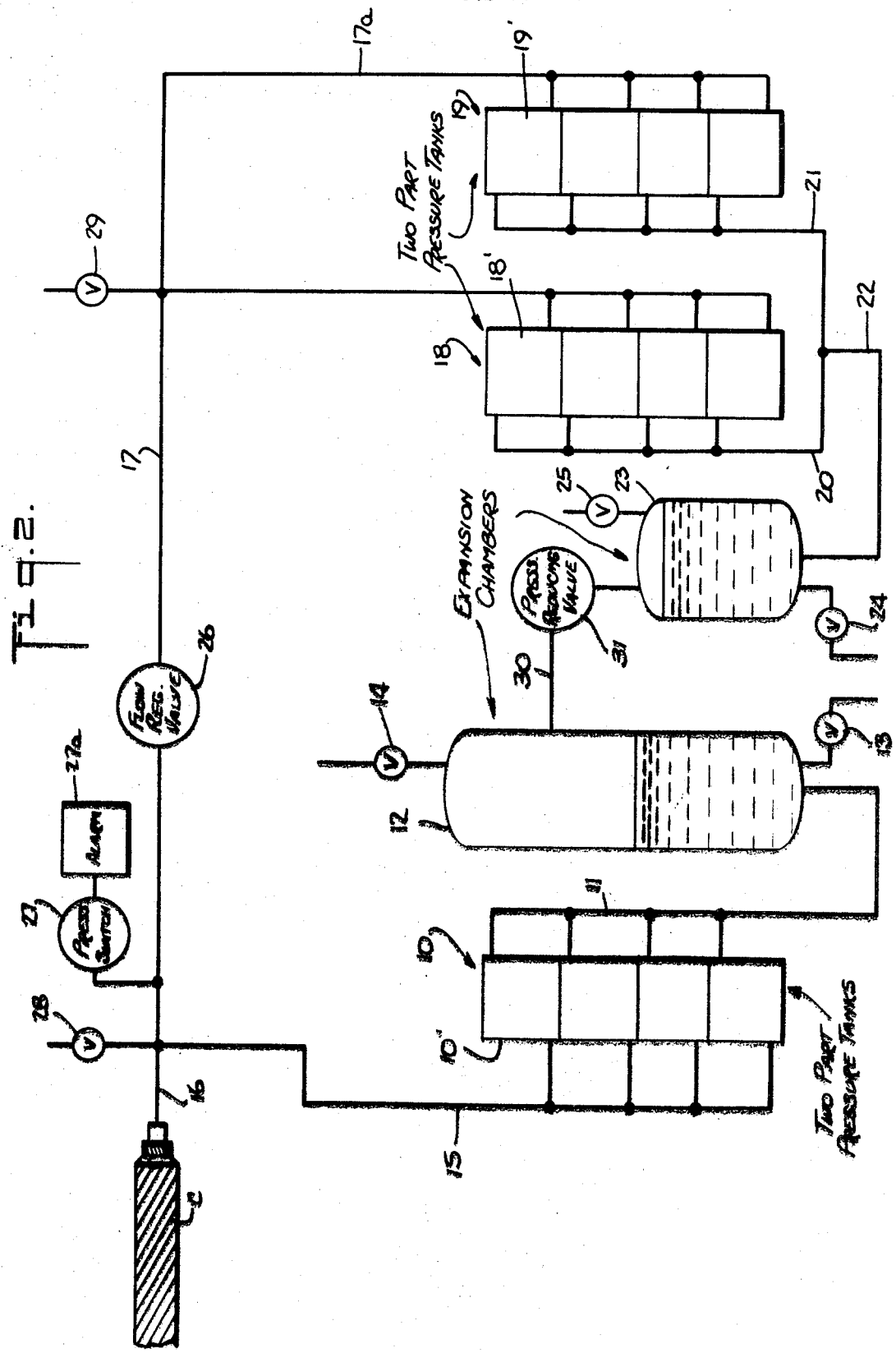
FIG. 2 represents diagrammatically a further embodiment of the compensation system according to the invention.

The further preferred embodiment of the system, illustrated in FIG. 2 (in which elements like those of FIG. 1 are indicated with like reference numerals), differs from the above described embodiment in that the two expansion chambers 12 and 23, instead of being completely separate, are connected through their respective upper parts intended to contain gas under pressure, namely, through those parts which are above the respective uppermost possible levels of the thrust oil, by means of a pipe 30 carrying a pressure-reducing valve 31.

During the installation of the system, it is therefore sufficient to adjust chamber 12 to operating pressure p and by means of the reducing valve 31 the pressure in chamber 23 is automatically brought to 2. p.

This system requires a chamber 23 of a smaller volume with respect to the system shown in FIG. 1, and is therefore preferred when only reduced room is available.

On the other hand, the system of FIG. 1 is reliable in course of time, owing to its structural simplicity.

It will be understood by those skilled in the art that the details of construction of the invention can of course be varied and that various modifications may be made therein without departing from the principles of the invention.

What is claimed is:

1. Apparatus for compensating for changes in oil volume in an oil impregnated electric power cable having means for supplying said oil thereto, said oil normally being maintained under a pressure within a predetermined range, said apparatus comprising at least one first pressure tank having a chamber for containing said oil and means for maintaining said oil under pressure within said predetermined range, at least one second pressure tank having a chamber for containing said oil and means for maintaining said oil in said last-mentioned chamber under a pressure substantially at least as low as the lowest pressure in said predetermined range, and means for connecting said first and second tanks to said means for supplying oil to said cable for oil flow therebetween.

2. Apparatus as set forth in claim 1, further comprising at least one further tank similar to said first tank and similarly having means for maintaining the oil in the chamber thereof under a pressure within said predetermined range connected in parallel with said first tank and at least one further tank similar to said second tank and similarly having means for maintaining the oil in the chamber thereof under a pressure substantially at least as low as the lowest pressure in said predetermined range connected in parallel with said second tank.

3. Apparatus as set forth in claim 1, wherein each of said first and second tanks comprises an elastic wall dividing at least a portion of the tank into said chamber thereof and a further chamber and said means for maintaining the oil in said first-mentioned chamber under pressure comprises means for supplying fluid under pressure to said further chamber.

4. Apparatus as set forth in claim 3, wherein said means for supplying fluid under pressure comprises a pair of expansion chambers, one connected to the further chamber of said first tank and one connected to the further chamber of said second tank.

5. Apparatus as set forth in claim 4, further comprising means including a pressure reducing valve interconnecting said further chambers, said reducing valve reducing the pressure in the further chamber of said second tank with respect to the pressure in the further chamber of said first tank.

6. Apparatus as set forth in claim 3, further comprising means limiting the movement of said elastic wall to within a predetermined range of movement.

7. Apparatus as set forth in claim 1, wherein said means for connecting said first and second tanks to said means for supplying oil to said cable comprises a flow regulating valve connected between said second tank and said means for supplying oil to said cable for limiting the rate of flow of oil from said second tank to said cable.

8. Apparatus as set forth in claim 1, further comprising means responsive to the drop of oil pressure below a predetermined value connected to said means for connecting said first and second tanks to said means for supplying oil to said cable.

9. Apparatus as set forth in claim 8, further comprising alarm means connected to said means responsive to the drop of oil pressure and operable thereby when said pressure drops below a predetermined value.

* * * * *